United States Patent [19]

Sturgill

[11] Patent Number: 4,528,012

[45] Date of Patent: Jul. 9, 1985

[54] COGENERATION FROM GLASS FURNACE WASTE HEAT RECOVERY

[75] Inventor: Dennis T. Sturgill, Toledo, Ohio

[73] Assignee: Owens-Illinois, Inc., Toledo, Ohio

[21] Appl. No.: 574,812

[22] Filed: Jan. 30, 1984

[51] Int. Cl.³ .............................................. C03B 5/16
[52] U.S. Cl. ..................................... 65/135; 65/136;
     65/337; 432/180; 432/181; 432/182
[58] Field of Search ..................... 65/136, 135, 337;
     432/180, 181, 182

[56] References Cited

U.S. PATENT DOCUMENTS

| 3,764,259 | 10/1973 | Alexander, Jr. | 432/180 |
| 3,880,639 | 4/1975 | Bodner et al. | 65/135 X |
| 4,022,571 | 5/1977 | Gentry et al. | 432/180 |

OTHER PUBLICATIONS

Mark's Standard Handbook for Mechanical Engineers, McGraw-Hill Book Co., pp. 9-114 to 9-116.
"Gas Turbines", by R. Morrisson, (1-3-79), USPTO-Scientific Library.
The Indirect Brayton Energy Recovery System; Lampiem et al., 1979, American Chemical Society, pp. 1625-1629.
Rankine and Brayton Cogeneration for Glass Melting, pp. 1-9 to 9-9, Hnat et al., 1981, Industrial Energy Conservation Technology Conference and Exhibition; Houston, Texas, Apr. 26, 1981.
Cogeneration from Glass Furnace Waste Heat Recovery, by J. G. Hnat et al., Feb. 1982, pp. 375-388, 9th Energy Technology Conference.

Primary Examiner—Arthur Kellogg
Attorney, Agent, or Firm—John R. Nelson

[57] ABSTRACT

There is disclosed an apparatus and method of recovering a portion of the waste heat produced in a high temperature industrial process, such as a glass melting furnace, where the furnace has at least a pair of regenerators which are alternately used to preheat the combustion air and serve as hot exhaust heat storage means. The hot exhaust gases from the process are passed through a heat exchanger where the heat is indirectly transferred to the clean compressed air at 100 psi from the compressor of a Brayton cycle energy recovery system with the hot compressed air being expanded in a high performance turbine. The exhaust from the turbine will be at atmospheric pressure and at a temperature between 750° F. and 900° F. This turbine exhaust is fed to the opposite side regenerator as clean preheated combustion air. One embodiment is directed to the use of a regenerator that is made up of primary and secondary sections with the exhaust to the heat exchanger being taken from a connection between the sections whereby the glass melting furnace is not effected whether the Brayton cycle system is in operation or the secondary is functioning without the Brayton cycle energy recovery system.

10 Claims, 7 Drawing Figures

COGENERATION FROM GLASS FURNACE WASTE HEAT RECOVERY

BACKGROUND OF THE INVENTION

Glass manufacturing, generally speaking, is a high temperature energy intensive operation where approximately sixty-five to seventy percent of the total energy used is consumed in the melting process. Typical gas or oil fired glass melting furnaces have thirty percent or more of their total input energy exhausted through the exhaust stack.

The fuel fired furnaces presently used for glass melting are either recuperative, regenerative, or direct fired. The recuperative type are typically smaller specialty glass furnaces; however, the regenerative types are basically the larger furnaces in which the regenerators take the form of brick work through which the combustion air is passed on its way to the area where the burners feed the fuel together with the combustion air into the furnace and through which the exhaust from the furnace passes on its way to the stack. The exhaust gases transfer their heat to the regenerator, or "checkers" in the form of bricks, as they pass through it. On the reverse cycle, the combustion air, which is clean air, brought in at ambient temperature, is passed through the regenerator on the other side; and thus picks up heat from the bricks, and in this way, preheats the air prior to its entry through the ports where the fuel is also introduced to cause combustion and melting of the glass in the furnace.

The more efficient regenerative furnace designs have combustion air preheating to a temperature of around 2300° F. Nearly all glass furnaces used to melt container glass, which is soda-lime-silica glass, are of the regenerative type and have production capacities somewhere between 180 and 400 tons melted per day. As explained, in present day furnaces, the heat energy used and recycled in regenerative furnaces is through the alternate passing of the exhaust and combustion air through the regenerators which serve as heat storage devices.

A typical well designed furnace melting 183 tons per day, through experience, would require an energy input into the melter of 4 MM BTU/ton of glass melted in fuel and 2.2 MM BTU/ton in preheated air. The energy outputs are 2 MM BTU/ton in molten glass, 0.8 MM BTU/ton in melter radiation losses, and 3.4 MM BTU/ton out the exhaust ports. Of the 3.4 MM BTU/ton in the melter exhaust, 65% or 2.2 MM BTU/ton is recycled back into the melter as preheated air by the regenerator heat storage. 0.2 MM BTU/ton is lost as regenerator wall losses and 1 MM BTU/ton goes up the stack with the combustion products. Less efficient furnaces will have greater stack losses and accordingly greater fuel requirements. Waste heat recovery programs have been aimed at the approximately 1 MM BTU/ton melted which goes up the stack. Some of the familiar programs utilizing the waste heat stream for energy input are batch preheating, waste heat boilers, and organic Rankine cycle heat recovery systems. Batch preheating recycles more of the exhaust heat back into the melter with further melter fuel reduction. The other two programs are aimed at using the exhaust heat for some other beneficial use, such as steam for inplant use or for the production of electric power.

The regenerator exhaust heat from a typical regenerative furnace is present at a maximum temperature of about 950° F. Since the minimum allowable stack exhaust temperature is about 450° F., due to the condensation and corrosion problems if the exhaust gas temperature is less than this, the best the heat recovery system can do is collect about half the heat in the regenerator exhaust. When the collected heat is run through a Rankine cycle to produce power, at best 20% of this half is converted to work and the remaining 80% is rejected into the environment as low quality heat. The addition of the Rankine cycle to the above described well designed glass furnace would result in an output of about 29 KWH per ton melted. Whether the working fluid selected is steam or an organic compound, in the Rankine cycle roughly 80% of the collected heat must be thrown away in order to convert the remaining 20% into useful work.

An alternative approach for converting the regenerator exhaust heat into power is through the use of an externally fired Brayton cycle. The major difference between a Rankine cycle and a Brayton cycle is that the Brayton cycle uses a gaseous working fluid without condensation of the rejected heat stream.

Considering a typical regenerative furnace and the heat values that are present through the various portions of the furnace, reference can be made to FIG. 1, which is a schematic representation of a typical side port furnace. The arrows shown thereon indicate the direction of flow of air and gases, and considering that air at approximately 2200° F. is entering at the upper left hand port and at the same time fuel is being introduced at this port as well, you will have an input into the preheated combustion air at 2200° F. which will have a heat content value of 2.5 MM BTU/ton of glass melted and the fuel heat content equal to 4.5 MM BTU/ton melted. Thus, there is a total heat input quantity of 7 MM BTU/ton of glass melted. From this point on, heat quantities will be understood to be normalized on a per ton of glass melted basis.

There is in a typical furnace a heat loss through the furnace wall of about 1 MM BTU. In addition to the exhaust, the glass that is issuing from the furnace will carry away heat quantities of about 2 MM BTU, thus leaving the heat quantity which is exhausted as combustion exhaust from the melter at 4 MM BTU. This heat will raise the temperature of the upper end of the checker works (on the right side in FIG. 1) to approximately 2600° F. The hot exhaust gas passes down through the right hand checkers and enters the lower canal at approximately a temperature in the range of 900°–1000° F. with a heat content equal to about 1.5 MM BTU. This exhaust gas then exits the canal and enters the stack at a temperature in the range 550° to 850° F. The combustion air is brought into the lower end of the left hand regenerator or checker works and enters with a heat content of 0 since it is atmospheric air at approximately 60° F., the enthalpy reference condition. This air is then heated to 2200° F. during its upward flow. It should be remembered that this cycle reverses itself, in that the combustion is reversed, and occurs at the other side with a reversal of the valve connections of the incoming air and the exiting exhaust to the stack. This is illustrated in FIG. 1.

In FIG. 2, there is shown this same typical side port furnace, but with one additional element, and that is the pre-preheating of the incoming air to the regenerator which is used to preheat the combustion air. Thus it can be seen that inlet air, rather than at 60° F. as explained with respect to FIG. 1, is now shown as being at 750°–800° F. This has a heat content of 0.6 MM BTU. This added preheat, then, will increase the heat content of the combustion air to 2.6 MM BTU so that after passing through the left hand checkers the temperature of the combustion air will be generally 2300° F. To this then could be added a fuel heat value of 4.4 MM BTU. It should be noted that this is 0.1 MM BTU less than that required with respect to FIG. 1. Again, the heat loss value through the melter wall would be 1 MM BTU and the glass issuing from the furnace would carry away heat quantities of about 2 MM BTU leaving an exhaust heat content of 4 MM BTU as it did in the earlier example with respect to FIG. 1. However, it should be kept in mind that since 750°–800° F. air is being introduced to the lower end of the checkers, the lower portions of the checkers will store more heat and be at a considerably greater temperature than without the 750°–800° F. air inlet. Thus, the temperature of the exhaust which arrives at the bottom of the right hand checker will be in the range of 1250°–1350° F. with a heat content of 2 MM BTU. This is then an increase in heat value of approximately 0.5 MM BTU; however, since the lower end of the checkers is connected to the stack, it can be seen that the exhaust entering the stack will be at a temperature of 800°–1200° F. It is to be noted that the preceding and following temperature and heat content relationships are a clear function of furnace system design and operation.

Taking the same typical furnace as shown in FIG. 2 and adding to it a Brayton cycle heat recovery system, it can be seen that a considerable saving may be effected. An elevated pressure heat exchanger is illustrated in FIG. 3 as being used in combination with the Brayton cycle heat recovery system wherein ambient air is brought into a compressor which in turn is driven from a turbine coupled thereto with the turbine being powered by the expansion of the compressed air from the heat exchanger with the exhaust from the turbine providing the 750°–800° F. preheat combustion air for the operation of the main melter. Also, in this situation the turbine will not only drive the compressor but may also drive an electric generator which will generate a certain amount of electric power.

As shown in FIG. 3, the Brayton cycle air turbine T, which is illustrated, will receive heated air from the heat exchanger at approximately 1300° F., with an expansion taking place in the turbine to drive the compressor, with the exhaust air from the turbine at >750° F., being fed into the melting system as the pre-preheat combustion air. This cycle, as compared to FIG. 2, serves to provide preheat air which is in excess of that required for combustion and reduces heat content of the exhaust to the stack while still maintaining the temperature in the acceptable range of 450°–500° F. The other temperature figures are essentially the same as the typical regenerative furnace with preheat air as shown in FIG. 2. The electric power generated by the Brayton cycle will thus be nearly double that by a Rankine cycle on a similar furnace.

The cogeneration of electricity from glass furnace waste heat is not a new concept per se and was a topic at the 9th Energy Technology Conference presented in February 1982 and is the subject of articles presented at such conference. One such article is reproduced in the minutes of the conference at pages 375–388, authored by J. G. Hnat, J. S. Patten and J. C. Cutting. This article explains the relationship of waste heat recovery systems using a steam Rankine cycle with the heat recovery medium being pressured steam, an organic Rankine cycle heat recovery system using toluene as the working fluid, and as a third system, an indirectly heated, positive pressure Brayton cycle heat recovery system. It is this type of system to which applicant's invention is directed, and which applicant will describe in detail hereinafter.

In addition to the article by Hnat et al, a second article by James G. Hnat, J. S. Patten, and Praven R. Sheth, all of Industrial Energy Research Division of Gilbert-/Commonwealth of Reading, Pa., was presented at the 1981 Industrial Energy Conservation Technology Conference and Exhibition in Houston, Tex. Apr. 26–29, 1981. This article describes Rankine and Brayton cycle cogeneration from glass melting. Here again, the systems which were evaluated and studied were a conventional steam Rankine cycle, an organic Rankine cycle, an indirectly heated pressurized Brayton cycle, and a sub-atmospheric Brayton cycle. The indirectly heated pressurized Brayton cycle is one which is most pertinent to the present invention. The study outlined in this article dealt with the positive pressure Brayton cycle, with the flue gases from the furnace transferring heat to compressed air delivered by a compressor at 38.7 psi and 265° F. The heated air was then expanded through a single stage turbine which drove both a compressor and a generator. The exhaust air from the turbine was delivered to the regenerator as preheated combustion air. A turbine expansion ratio of 2.5 to 1 was used for the positive pressure Brayton cycle based upon a review of data published on heat recovery turbo expanders used in fluid catalytic cracking processes. Studies on waste heat recovery by Garrett Airesearch Manufacturing Company as cited in this article by Hnat, Patten and Sheth suggest using an expansion ratio of 3.5 to 1. The turbine and compressor efficiency assumed by Hnat et al were 85% and 87%, respectively. Heat exchange parameters in the range of 70% to 92.5% were considered, and the impact on cycle performance examined. The conclusions reached by the authors about performance and cost comparisons of this study indicate that the Brayton cycle generates progressively less electric power as heat exchanger effectiveness decreases. The authors acknowledged conclusions by others, viz., Rose & Colosimo, *Power, Energy Systems Guide Book*, August 1980, pages 42–43, that the minimum turbine inlet temperature for effective Brayton cycle performance was on the order of 1300° F. Therefore, the authors were not surprised that the electrical power conversion efficiencies predicted were low. The authors raised assumed heat exchanger effectiveness from 70% to 85% and calculated a significant increase in power for the Brayton cycle. However, the power output was still observed to be substantially less economically attractive than Rankine cycle systems. It should be remembered that all of these are assumptions based on factors which do not necessarily represent the true conditions which would be obtained in a plant. As is the subject of this invention, the authors did not recognize the real potential of the positive pressure Brayton cycle in furnace waste heat recovery.

Another article published in 1979 by the American Chemical Society is the Indirect Brayton Energy Recovery System authored by B. E. Lampinen, R. R. Gutowski, A. Topouzian and M. A. Pulick of Ford Motor Company, Dearborn, Mich. This article describes the simple Brayton Cycle when applied to exhaust gas at 1300° F. with exhaust to ambient at 410° F.

The Brayton cycle takes air at 100° F. into a compressor, passes the exit air from the compressor to the heat exchanger and from the heat exchanger to the turbine with a preheat air exiting from the turbine at 930° F. This article also describes an IBERS cycle, which is a variation of the simple Brayton cycle. In the IBER system, hot exhaust gases are expanded from atmospheric to sub-atmospheric pressure directly through a turbine. Exhaust gas leaving the turbine is then passed through a heat exchanger where it is cooled to 200°–300° F. The cooled gas is then compressed back up to atmospheric pressure by the compressor coupled to the turbine. In this study it appears that the IBERS cycle is considered to have advantages over the simple Brayton cycle for recovery of waste heat. This IBERS cycle, or Indirect Brayton Energy Recovery System, is one in which the exhaust gas from the furnace itself is passed through the turbine and then the output from the turbine is passed through the primary of the heat exchanger then back to the compressor where the exhaust temperature is 460° F. By and large the remainder of the article deals with the advantages of the IBERS cycle over the simple Brayton cycle. The IBERS cycle has 2 major disadvantages for use in waste heat recovery systems. These are, first, that one is forced to run the dirty furnace exhaust gas through the turbo machinery or alternatively develop a hot clean up method, and, second, that the low pressure operation requires a larger physical size in turbo machinery and heat exchange equipment.

SUMMARY OF THE INVENTION

This invention relates to the process and apparatus for recovering a significant portion of the waste heat from a high temperature industrial process where the temperature of the combustion products is used to heat the inlet air to a high performance gas turbine of a positive pressure Brayton cycle to a temperature in excess of 1300° F., where the air flow through the compressor section of the system exceeds 10 lb m/sec and the exhaust from the turbine is used as the source of preheated combustion air for the industrial process.

DETAILED DESCRIPTION OF DRAWINGS

Figure 1:
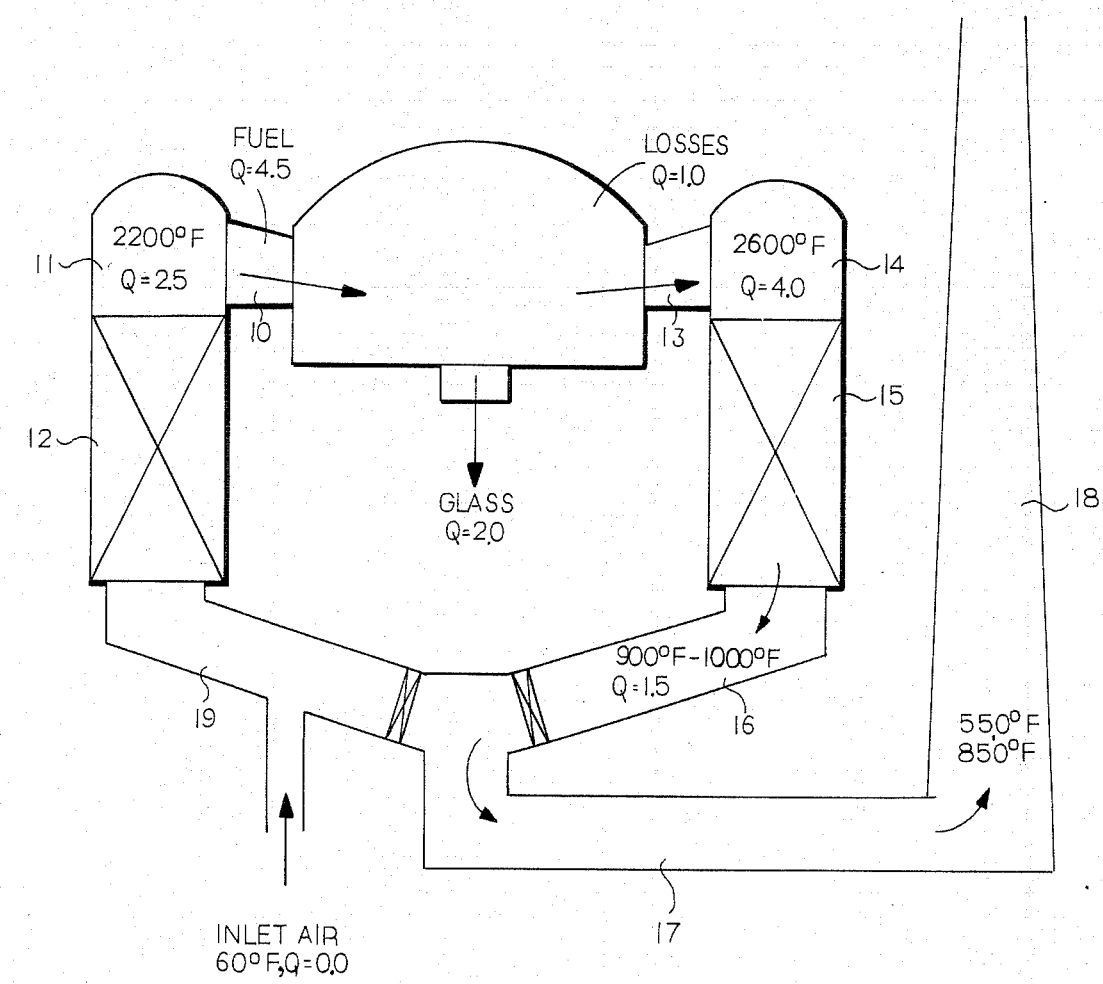
FIG. 1 is a schematic view of a heat flow diagram of a typical regenerative furnace.
Figure 2:
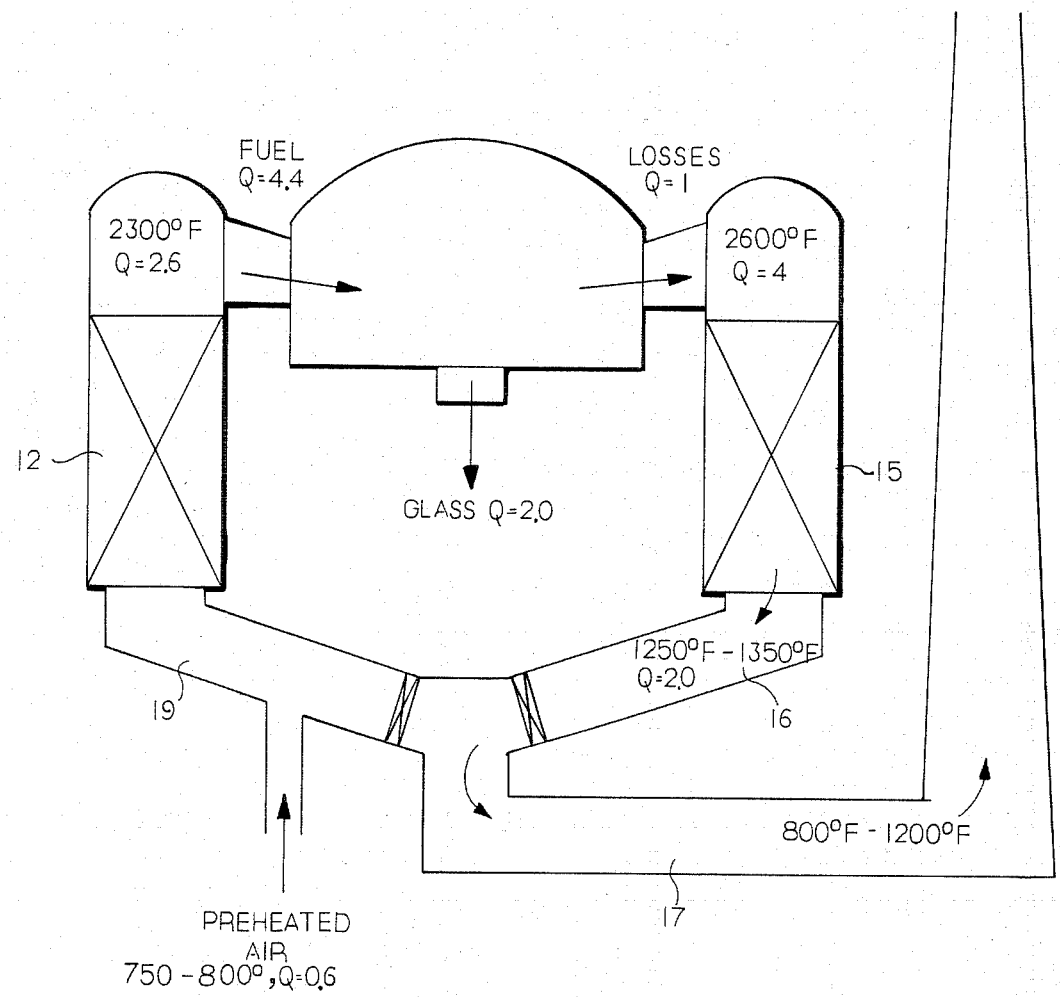
FIG. 2 is a schematic view of a typical regenerative furnace similar to that of FIG. 1, with the addition of a preheated combustion air supply.
Figure 3:
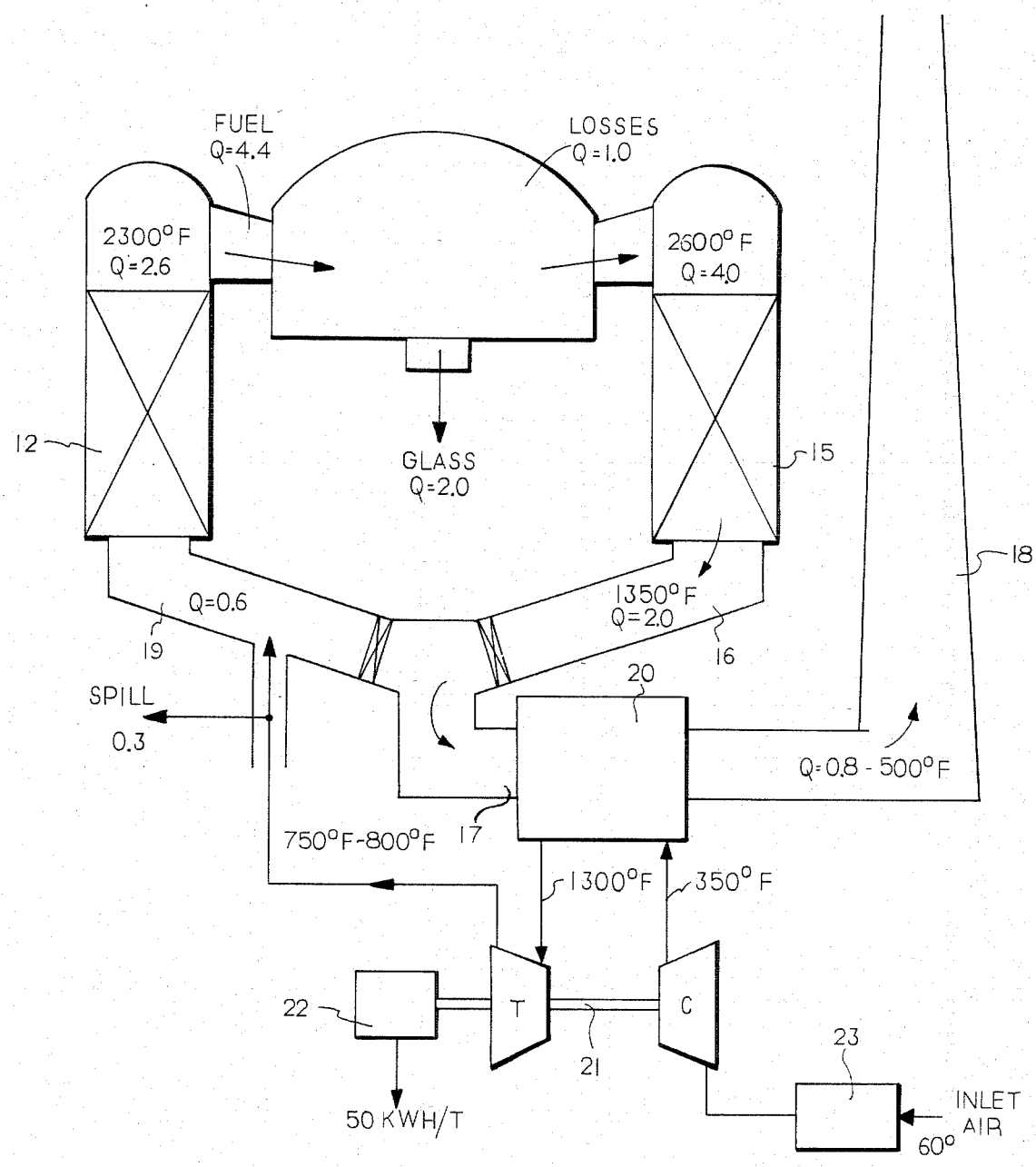
FIG. 3 is a schematic view of a regenerative furnace similar to FIG. 1, with the addition of a heat exchanger and Brayton cycle energy recovery system of the invention.

With particular reference to FIGS. 1–3, the evolution of the use of preheated combustion air, and then the further evolution of the use of a heat exchanger in the exhaust gas conduit with a simple Brayton cycle energy recovery system, will be explained in terms of heat flows or the heat content of the various streams expressed in millions of BTU's per ton of glass melted, or Q values, which will be present in a good typical regenerative furnace.

With specific reference to FIG. 1, there is shown a typical regenerative furnace with a fuel Q value equal to 4.5, and is supplied at the entrance port 10. The combustion air, which enters through the port 10 from the upper structure 11 of the left side regenerator 12, will have a heat content of 2.5 and temperature of approximately 2200° F. Thus, the total heat content input to the furnace will be equal to 7. As previously explained, there will be a Q loss of 1 through the furnace walls due to radiation leakage and other anticipated and actual heat losses. The glass which will exit from the furnace, for example, in a container glass operation discharged as gobs to the forming machines, will carry from the furnace a heat value equal to 2. Logically, then, as the fuel is burned and the exhaust will occur through an exit port 13 to the upper structure 14 of the right side regenerator 15, the heat quantity which exits from the furnace in the form of exhaust gases will have a temperature of approximately 2600° F. and a heat content value of 4. This exhaust gas passes downwardly through the right side regenerator 15 and exits at the bottom into a canal or channel 16 and is typically at a temperature range of 900°–1000° F. with a heat content value of 1.5 comparable to 950° F., it being understood that a 2.5 heat content has been transferred to and stored in the right side regenerator 15. From the channel 16 the exhaust gases go through a channel 17 to a stack 18. The exit temperature in the stack then is in the order of 550°–850° F.

The inlet combustion air, which is supplied to the typical regenerative furnace through a canal or channel 19, will have an entrance temperature of, for example, 60° F., as an average, and have a heat content value of 0. Upon reversal of the system, as these typical regenerative furnaces operate, the air will be introduced into the channel 16, while the exhaust gases will be coming from the lower end of the left regenerator through the channel 19 and thence to the canal 17. It is apparent that the ambient air picks up its heat in the regenerator and is elevated to the 2200° F. temperature therefor.

Turning now to FIG. 2 wherein there is illustrated a situation in which a 750°–800° F. preheated air having a Q value of 0.6 is introduced to the channel 19. It should be understood that the same reference numerals are applied to the identical pieces of equipment as set forth in FIG. 1. Thus, it can be seen from FIG. 2 that by the addition of 750°–800° F. combustion air entering into the channel 19, the regenerator 12 will raise the temperature of this air to approximately 2300° F. at which time this combustion air will have a Q value of 2.6. To this then can be added fuel having a Q value of 4.4 to again achieve the required Q value of 7 in entering the melter or furnace M. Again, the losses from the melter will be of a Q value 1 and the exhaust temperature of 2600° F. with a Q value 4 will be obtained. However, it should be pointed out that since preheated air is introduced to the lower end of the checker or regenerators 12 and 15, these regenerators store a greater amount of heat on each cycle and thus the exit temperature for the exhaust from the right side regenerator 15 into the channel 16 will be at a temperature in the range of 1250°–1350° F. with a Q value of 2 for the 1350° F. temperature. Thus the exhaust into the canal 17 and to the stack 18 will be elevated to the range of 800°–1200° F. temperature. Thus it can be seen that while the use of preheated air may reduce the fuel by a Q value of 0.1 and thus result in a fuel saving, the exhaust temperatures and the temperature of the exhaust gases to the stack are at a considerably higher level than that in the typical furnace operated with ambient combustion air. Thus it can be seen that it would be advantageous if the energy in the exhaust gases, which are in the 800°–1200° range, could be harnessed and used to provide the preheat air, that there could then be a somewhat increased saving in fuel over the situation which is explained with respect to FIG. 1.

Turning now to FIG. 3, it would be advantageous, as stated, to provide a system of recovering the lost heat which is going up the stack, and in doing this to reduce the stack temperature to around 450°–500° F. It is understood that a stack temperature less than 400°–450° F. would be detrimental in that it would result in the condensation in the stack of undesirable corrosive acids and other harmful reaction products which would be produced at a lower temperature. In FIG. 3 there is shown a heat exchanger 20. The heat exchanger is shown as being in the canal 17, thus receiving all of the exhaust gases from the melter. The heat exchanger is a part of a Brayton cycle, it being understood that, by definition, the Brayton cycle is a thermodynamic cycle composed of two adiabatic and two isobaric changes in alternate order. It is also sometimes called "Joules Cycle". The Brayton cycle is obviously an indirect type in that the exhaust gases which pass through the heat exchanger and the air which is being heated by the exhaust gases, do not come into direct contact with each other or become mixed together therewith; thus, the heat exchanger 20 is, what is termed, an indirect heat exchanger.

The Brayton cycle, in its simple form, is composed of a compressor, labelled C in FIG. 3, coupled mechanically by a shaft 21 to a turbine labelled T and in turn having the output shaft 21 thereof driving a generator 22 for generating electric power. Electric power output is shown by the arrow extending downwardly from the generator 22. The compressor C has its inlet connected, through a filter 23, to ambient air entering at approximately 60° F. This filtered air passes to the compressor which compresses the air and at the same time will raise its temperature to approximately 350° F. This air under pressure is then fed through the heat exchanger where it picks up additional heat to increase its temperature and will exit the exchanger at approximately 1300° F. and at an elevated pressure in the neighborhood of 100 psig. This heated pressurized air will expand in and drive the turbine T, which in turn drives the compressor and the generator 22. The exhaust from the turbine T will be at approximately 750°–800° F. and this then becomes the source of preheated combustion air that is added into the checkers at the left side, as shown in FIG. 3.

Again, it should be pointed out that upon a reversal of the furnace, the inlet air will be connected to the opposite channel 16, and the burner port and the exhaust port will be reversed. Again, the heat exchanger will still experience the same Q effects as were explained previously with respect to FIG. 2. However, it can be seen that the exhaust temperature from the regenerator after passing through the heat exchanger has dropped the temperature of the exhaust to 450°–500° F., and that now, not only has the system produced the preheated combustion air, it also is projected as being capable of producing electric power in the neighborhood of 50 KWH per ton of glass melted. It should be pointed out that all three examples in FIGS. 1–3 are on a typical 183 ton per day melter. In this system the fuel required has been reduced since only a Q of 4.4 is required and there is an additional pay back of electrical energy produced. Also, in this system the incoming air which is passed through the compressor, the heat exchanger, the turbine and then becomes the preheated combustion air, will be in excess of that required. Thus, it can be seen that a portion of the exit air from the turbine will need to be spilled, and in view of the fact this air is clean, it can be used for space heating in a glass plant or for some other purpose where air at 750°–800° F. would be useable.

The Brayton cycle naturally becomes a part of the air preheat recycling loop injecting the turbine exhaust air at 750°–800° F. into the combustion air inlet of the furnace and puts a Q value of 0.6 back into the loop. The higher total air preheated at the top of the checker or regenerator carries an additional Q value of 0.1 over that system disclosed in FIG. 1 into the melter with the corresponding melter fuel reduction. Putting 750°–800° F. air in the bottom of the regenerator also raises the exhaust temperature to approximately 1350° F., and the total exhaust heat from a Q of 1.5 to a Q of 2. Now the heat exchanger can be designed for an effectiveness of collecting a Q of 1.2 while still letting the stack gases go at 500° F. or a Q of 0.8 (with a 1350° F. waste stream, a Brayton cycle can operate to convert the output of the heat exchanger into power to yield approximately 50 KWH per ton which is almost twice the output of the comparable Rankine cycle). Of the Q of 1.03 rejected by the Brayton cycle, a Q of 0.6 is put back into the furnace as air preheat and a Q of 0.3 is spilled, hopefully, for other constructive uses. The reason a Q of 0.3 must be spilled is because the mass flow of air through the gas turbine normally exceeds the combustion air requirement for the furnace. The amount of spill will depend upon furnace design and operating conditions and the match between the turbo machinery and the furnace system. The surplus is a clean hot air stream available for space heating or other heating applications.

In the example shown in FIG. 3, the Brayton cycle has nearly twice the output of the Rankine cycle operating at the same host furnace conditions because the Brayton cycle rejected heat can be put back into the process as preheated air. The reason that the rejected heat from the Rankine cycle cannot be put back into the process is because the Rankine cycle would normally reject its heat at less than 200° F. Trying to put such low temperature heat back into the furnace proves to be impracticable. It should be noticed that in the Brayton cycle, when we put a Q of 0.6 back into the regenerators as preheated air, only about a Q of 0.1 goes toward melter fuel reduction while a Q of 0.5 comes back out of the furnace at high temperature ready to be run through the conversion cycle again.

As one looks at the energy flow diagram for the Brayton cycle energy recovery system shown in FIG. 3, two things meet the eye. First, one would like to get the 750°–800° F. clean air, which is shown as spilled, back into the overall glass process as an auxiliary heat stream. In the case that it can be used, some additional investment would be required to put it to work. Second, and most important, the 0.17 MM BTU per ton, which is converted into power, has a value of roughly three times the cost of the input heat. If we multiply the converted input energy by 3 and add the value of heat energy put back into the melter, the 4 MM BTU per ton provided to the heat recovery system is converted into 0.51 MM BTU per ton value by the Brayton cycle plus 2.6 MM BTU per ton returned to the melter. Therefore, the regenerator-Brayton cycle combination is operating as a 77.8% efficient energy recovery system. If we view the system of FIG. 1, the efficiency of heat recovery for the regenerator alone as determined by comparing the heat returned to the melter from the heat recovery system with the heat provided to the heat recovery system, is (2.5/4)×100 or 62.5%. The more heat fed to the Brayton cycle, the higher the combined recovery system efficiency gets. Therefore, one would want to put as much of the air preheating load as possible on the Brayton cycle and as little as possible on the regenerators. In other words, one would like to put all of the melter exhaust heat through the gas turbine. Unfortunately, the temperature limitations of heat exchangers and turbine blades prevents one from accomplishing such a feat. However, it has been shown that a greater amount of heat output from the heat exchanger, such as raising its temperature, will increase the output of the turbine as the higher heat content higher temperature air is expanded and in turn operates to increase the output of the generator.

Applicant has found, however, that to make the Brayton cycle turbine operation more efficient and provide greater pay back, the turbine should be operated at an increased inlet temperature of about 1450° F. This increase in temperature of the input to the turbine may be provided by the use of a burner whose combustion air may be supplied from a portion of preheat air at the elevated temperature of 750°–800° F., thus reducing the expense and cost of this combustion heating which takes place in a burner B (FIG. 4) emptying into the exhaust duct just in advance of the heat exchanger. This additional function, which is considered a part of the present invention, is shown in FIG. 4 and explained in detail in the following description.

Figure 4:
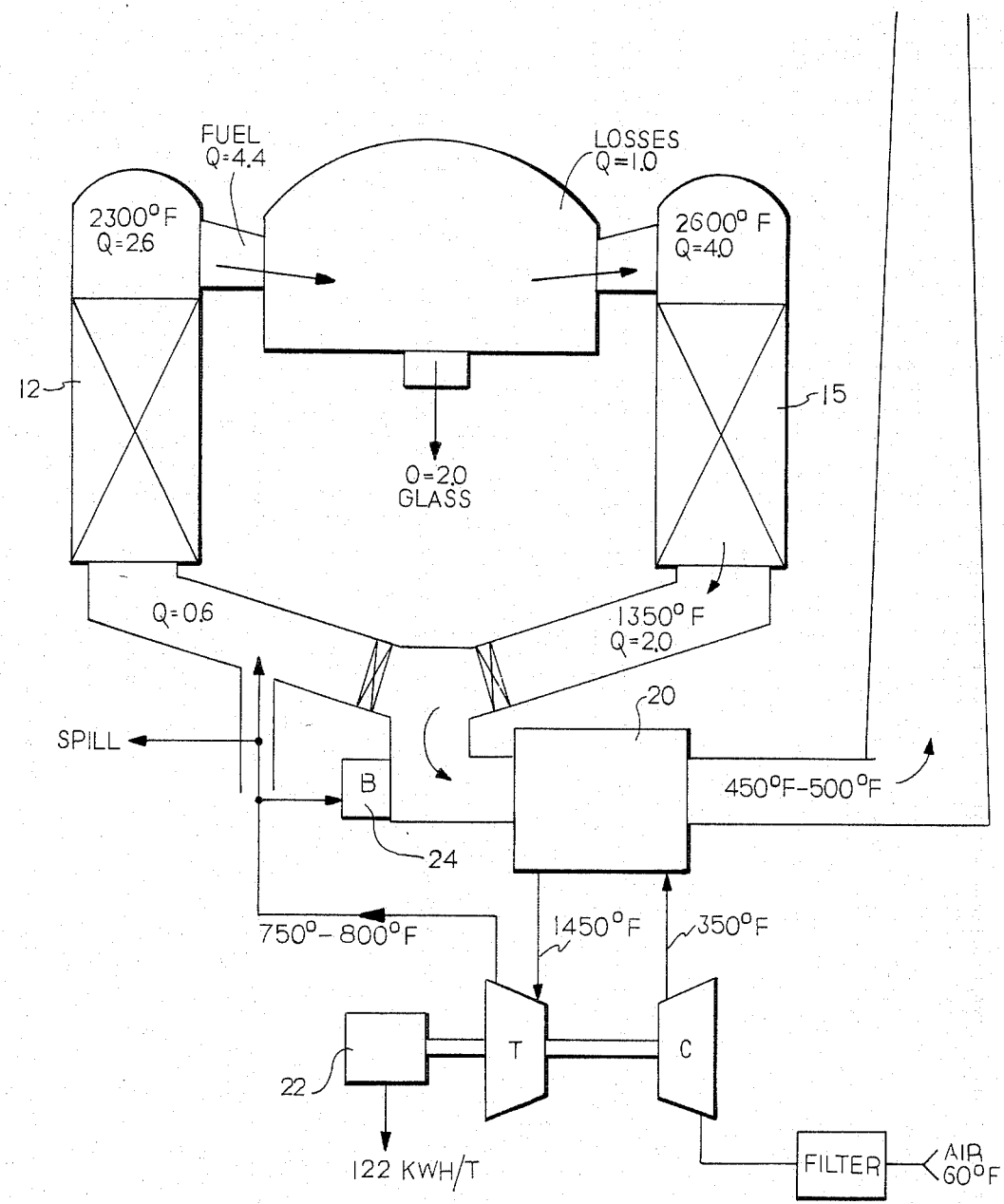
FIG. 4 is a schematic view and a heat flow diagram of a regenerative furnace with an exhaust temperature boost to the heat exchanger of the Brayton cycle energy recovery system of the invention.

With the foregoing in mind, and with reference in particular to FIG. 4, there is shown a furnace which is operating in essentially the same manner as that set forth in FIG. 3. All of the elements are essentially the same in regard to the apparatus of FIG. 3 with the exception of the addition of a space heater or trim burner 24.

The burner 24 will increase the temperature of the exhaust from the right side regenerator and increase it from the 1350° F. temperature up to about 1600° F. at the entrance to the heat exchanger 20. The burner 24 is provided with some of the preheated combustion air at 750°–800° F. coming from the turbine T. Thus, the space heater or trim burner is provided with preheated combustion air to further save in the operation of the space heater. The remaining portion of the exhaust air from the turbine T is again supplied to the left side checkers or regenerator 12. It can be seen that in this situation the amount of air issuing to spill may be somewhat less, depending upon the amount of preheated air used to operate the burner 24. By having the input to the heat exchanger at an elevated temperature of 1600° F., the 350° F. air coming from the compressor C and entering the heat exchanger 20 will come out at about 1450° F. This 1450° F. air from the heat exchanger 20 will be at approximately 100 psi and will be expanded in the turbine T to drive the turbine and the compressor, as well as the generator 22, with the output of the generator being approximately 122 KWH per ton of glass melted. Thus, it can be seen that when the glass melter is of a 200 ton/day melter, the total output would be 24,400 KWH per day output.

The trim burner 24 that is located to add heated air to the exhaust canal, as shown in FIG. 4, provides an arrangement where the combustion products will pass into the heat exchanger 20 and indirectly heat the inlet air to the turbine. The efficiency of the embodiment of FIG. 4 as a energy recovery system, as determined by comparing the sum of the heat returned to the melter and 3 times the electric power generated with the sum of the heat provided to the heat recovery system and the trim fuel, is 83.1%.

Figure 5:
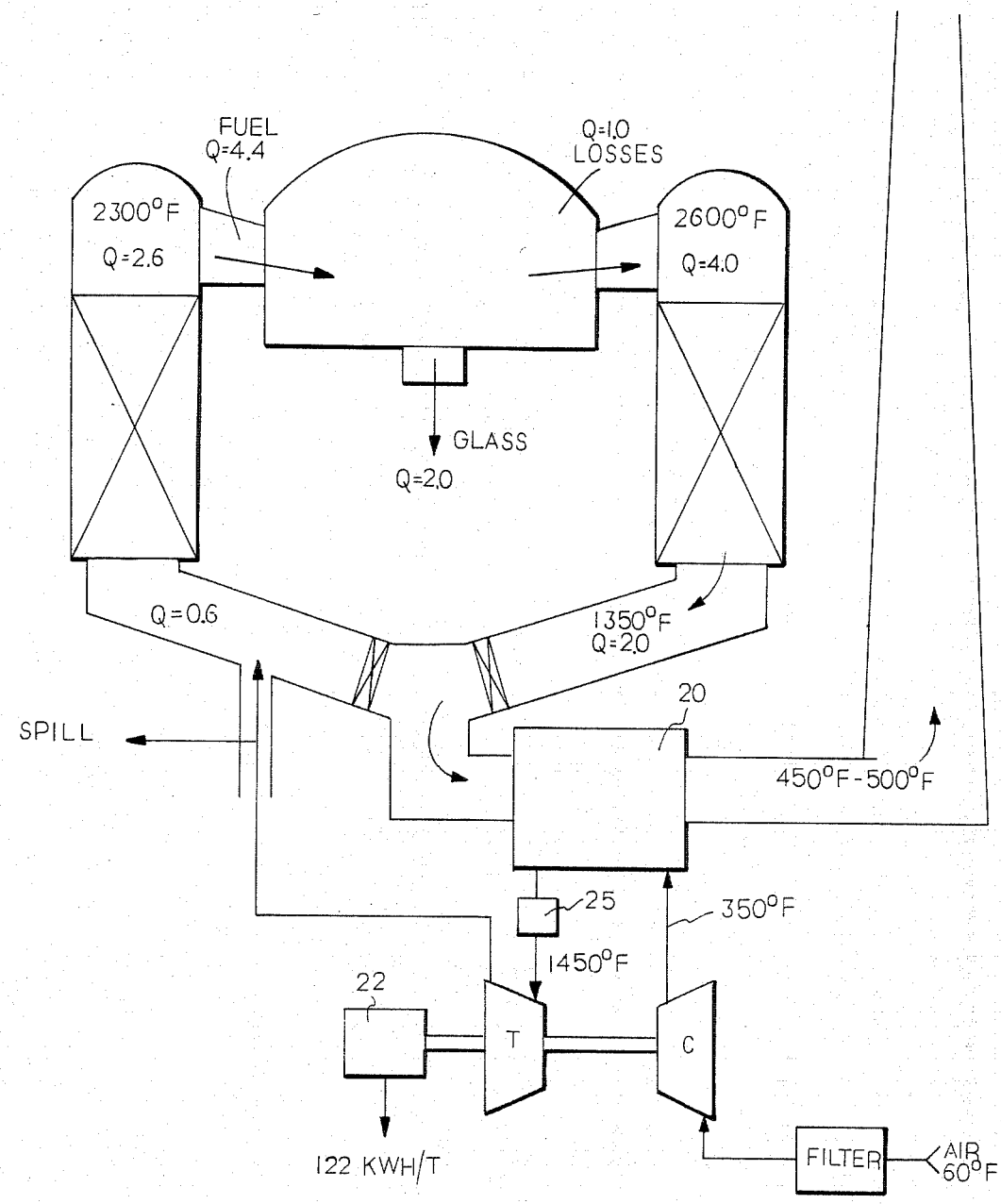
FIG. 5 is a schematic view and a heat flow diagram of a regenerative furnace similar to FIG. 4, illustrating a second embodiment of the Brayton cycle energy recovery system of the invention.

Another embodiment of the use of a trim burner is shown in FIG. 5 where the burner 25 is provided in the connection between the heat exchanger outlet and the turbine inlet. In this arrangement, burner 25 fires directly into the output from the heat exchanger using pressurized combustion air so as to enter into the 100 psi stream flowing to the turbine. The products of combustion from the relatively clean exhaust of the trim burner will not be so contaminating as to seriously affect the performance of the turbine. The embodiment of FIG. 5 can be operated with an essentially similar heat balance and efficiency with respect to FIG. 4.

The inlet temperature of the gas to the turbine is 1450° F. and the exhaust gas temperature will be at 750°–800° F. The generated power will again be at 122 KWH/ton with the penalty to the embodiment of FIG. 4 from having the trim burner output subject to the efficiency of the heat exchanger offset by the credit for use of spill air at 750°–800° F.

Figure 6:
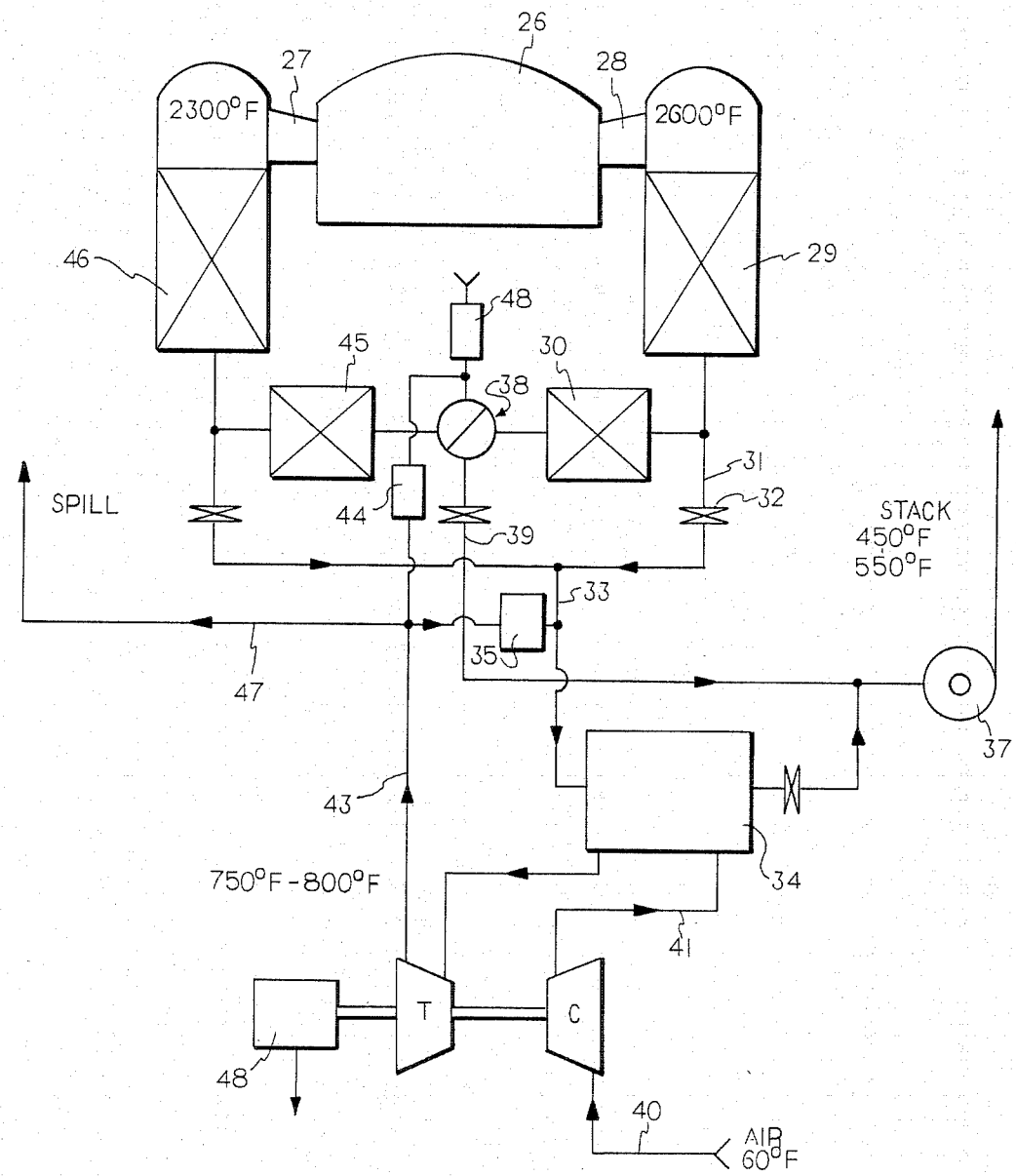
FIG. 6 is a still further embodiment of the energy recovery system of the invention as applied to a regenerative furnace which has both primary and secondary regenerators.

Turning now to FIG. 6, the invention will be described as applied to a large size regenerative glass melting furnace of the type where the regenerators are divided into primary and secondary regenerators. In this embodiment, a melter 26 is fed with combustion air and fuel through a side port 27 with the exhaust being through an opposed side port 28, which leads to a right side, primary regenerator 29. A secondary regenerator 30, which in practice is generally positioned below and in full communication with the bottom of the primary, would normally receive the hot exhaust gases from the primary and pass them to the exhaust stack after extracting as much heat as possible without cooling the exhaust below 450°–500° F. In this embodiment of the present invention a significant proportion of the exhaust gases are extracted at the juncture of the primary and secondary through the duct 31 via valve 32 to a header 33 which leads to a heat exchanger 34.

The header 33 carries the heat source stream to the indirect heat exchanger of the Brayton cycle energy recovery system and has a trim burner or space burner 35 connected thereto. The space burner 35 is used to increase the temperature of the exhaust gases to about 1600° F. The header 33 connects to the primary path through heat exchanger 34. The exhaust from this path in the heat exchanger passes through a valve in a conduit 36 and connects at a "T" with the inlet to a multi-speed fan 37 which exhausts to the stack. Those portions of the exhaust gases from the primary regenerator 29, which pass into the secondary 30, are passed through a reversing valve 38, then through a valve in a line 39 which also is connected to the stack draft fan 37.

Ambient air, at about 60° F., enters a compressor C through an inlet pipe 40. While the compressor C is diagramatically shown in the drawings as a single stage, it should be kept in mind that the compressor is actually one consisting of multiple stages in order to maximize efficiency while providing the required high compression ratio. The stages of the compressor will be provided with cooling between the stages in order to reduce the work required in the second stage. By the same token, the turbine may be of the multi-stage type to maximize efficiency. The exit from the compressor C is through a line 41 which extends to the secondary path in the heat exchanger 34, exiting therefrom at a temperature of approximately 1450° F. and at a pressure of 100 psi. This exit from the heat exchanger is through a passage 42 which connects to the inlet of a turbine T. The exhaust from the turbine T is through a pipe 43 which extends through a metering and control device 44 which will meter the air and control the flow through the other side of the reversing valve 38. Flow through valve 38 will go through the left hand secondary heat recovery regenerator 45 and from this into the left side primary regenerator 46. The air exhausting through the line 43 from the turbine T will be at a temperature of approximately 750°–800° F. and any air in excess of that required for combustion that is issuing from the turbine T may be spilled through a branch pipe 47. As previously explained, this spill may be used as a space heating source of hot air since the air is clean and can be utilized as a clean hot air at 750°–800° F.

A second metering and control device 48 operating in conjunction with control 44 serves to proportion the quantity of ambient air being fed to the regenerators on the combustion air preheat side of the melter. As depicted in FIG. 6, this would be the primary 46 and secondary 45 which preheat the combustion air above the 750°–800° F. level. The temperatures of the air at the upper end of the primary 46 will be approximately 2300° F. with the exhaust side 29 being at approximately 2600° F. The temperature of the gas coming from the right primary will be at approximately 1400° F. and, as previously explained, the temperature of the gas exiting from the burner and the exhaust gas will be entering the heat exchanger 34 at approximately 1600° F. The temperature of the exhaust up the stack will be in the 450°–500° F. range and the exhaust gas from the turbine, as previously explained, will be 750°–800° F., and as in the previous examples, the turbine drives both the compressor C and a generator 48. The particular furnace depicted in FIG. 6 is an actual furnace of a fairly large size which has both primary and secondary heat recovery chambers on each side and a plenum between the two such that heated exhaust gas can be extracted and used in the heat exchange system of the positive pressure Brayton cycle to generate preheated air and electricity.

A particular advantage of this embodiment is that the furnace is indifferent to whether the Brayton cycle is in operation or not. In the latter case all of the exhaust gas passes through the secondary regenerator. In either case, furnace load can be maintained without a fuel penalty. Furthermore, a furnace which is already equipped with secondary regenerators permits a genuine retrofit capability for the Brayton cycle system. That is, the Brayton cycle may be added without major change to the furnace system.

Figure 7:
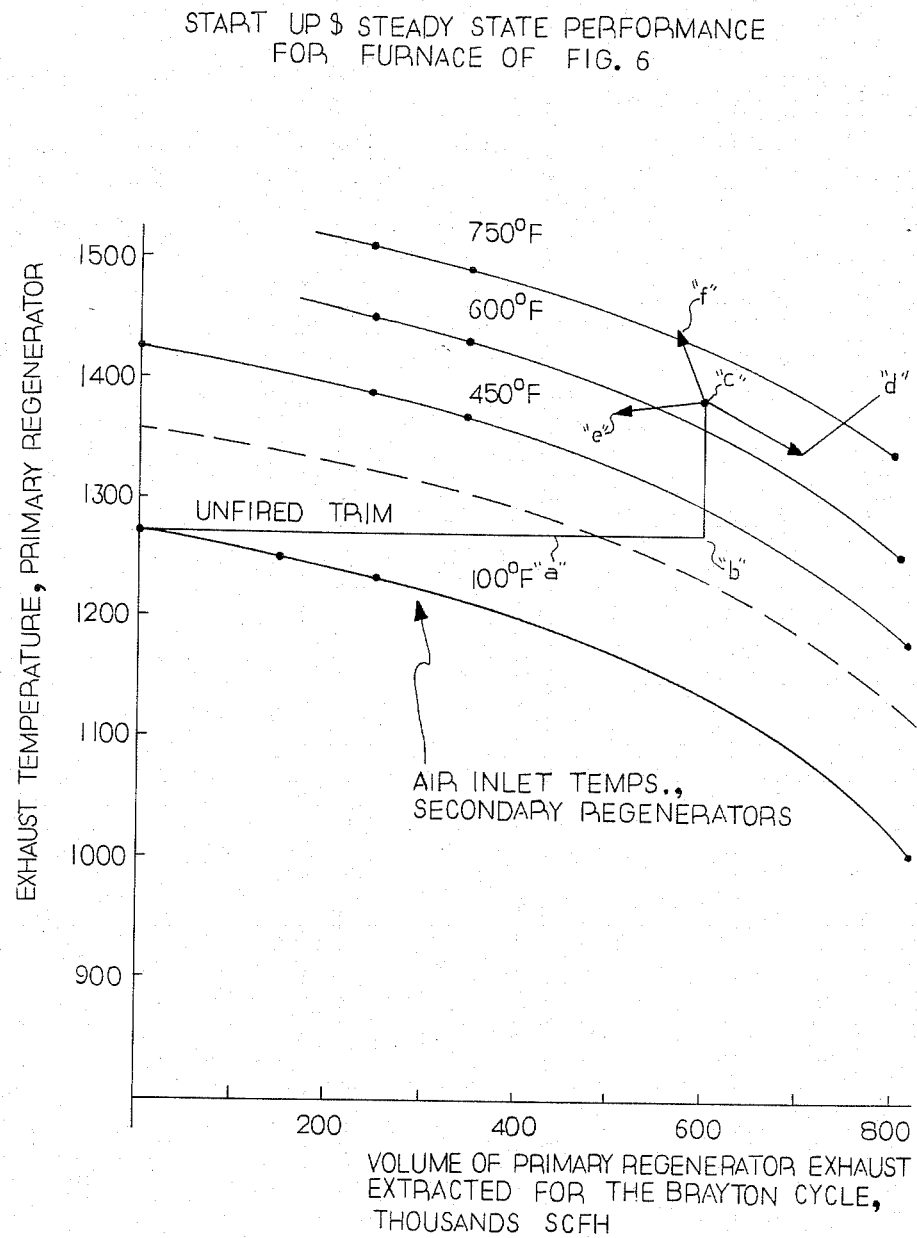
FIG. 7 is a diagram showing start-up and steady state system performance with the furnace of FIG. 6.

Turning now to FIG. 7, there is shown the primary regenerator exhaust gas temperature vs. the volume of primary regenerator exhaust extracted for the Brayton cycle for the furnace of FIG. 6. The family of curves labelled 100° F., 450° F., 600° F. and 750° F. correspond to the temperature of air at the inlet to the secondary regenerator. Thus, 1275° F. exhaust is available at 100° F. air inlet temperature with the startup of the Brayton cycle of FIG. 6, since none of the exhaust gas has yet been extracted. The 100° F. curve slopes downward with an increase in extracted volume from the waste gas exhaust of the primary. At steady state the air exhaust from the Brayton Cycle Recovery System will be in the 750°–800° F. range representing the temperature of exhaust air from the turbine. This 750°–800° F. air is fed into the secondary of the opposite side regenerator and thence through the primary to become the preheated combustion air. But, as the diagram shows with line "a", as the system is started up and extraction is greater than "0" the transient effects of increasing secondary air inlet temperature by virtue of turbine exhaust temperature about balance the tendency to decrease primary exhaust temperature as extraction is increased, thus reaching point "b" at the extraction rate of 600M SCFH (standard cubic feet per hour). At this transient point the system will produce 460 KW of power.

The furnace of diagram 7 is modelled as operating at the level of 340 tons melted per day with 25% cullet and the outside air temperature of 60° F., and its regenerators will reverse in its normal operation and with each reversal the temperature of the primary regenerator exhaust gas and the inlet air (from the turbine exhaust) will increase until a steady optimum state is reached at point "c" where the temperature of the exhaust gas is at about 1400° F. and the available heat will result in the Brayton cycle energy recovery system producing 625 KW of power.

It was found, however, that increasing the extraction volume to 700M SCFH actually resulted in a reduction of output to 620 KW, point "d". Also, if the extraction volume were decreased to 500M SCFH, the efficiency would fall to the point where the output would be 425 KW, point "e". Thus, the 600M SCFH was the optimum extraction volume for this furnace design and operating level, and resulted in the steady state output of the system shown in FIG. 6 and was 625 KW *without* trim burner operation.

The trim burner was then projected into the model as being fired at a level of 2 MM BTU/hr. and the increased temperature of the heated exhaust resulted in an output of 900 KW, point "f". Thus, the 2 MM BTU/hr. heat input resulted in an increased power output of 275 KW. The effective heat rate for the trim burn therefore was 7273 BTU/KWH. The thermodynamic 1st law efficiency of this trim burn is found to be 47% which is considerably higher than the efficiency of the conventional power generating plants that at best are about 35%.

Thus, it can be seen that the operation of the trim burner to increase the exhaust temperature, which also may slightly reduce the fuel firing requirements, results in an increase in power output, where the incremental power output is at a heat rate superior to that of conventional central power stations.

The trim burner can add this extra heat up to the limits of the materials from which the heat exchanger and turbine are constructed.

While the foregoing description provides three embodiments of the invention as applied to a glass melting furnace, it should be kept in mind that the positive pressure Brayton cycle energy recovery system disclosed herein would have application to any high temperature industrial process having waste heat. The system of the invention uses a high performance gas turbine-compressor combination designed for compressor efficiency in excess of 80% and turbine efficiency in excess of 85% at a turbine inlet pressure ratio greater than 4 to 1. Furthermore, the turbine inlet temperature should be in excess of 1300° F. and the air flow through the compressor section exceeds 10 lb. (m)/per second with a major portion of the turbine exhaust being used as preheated combustion air.

In the system of the invention, when the turbine and compressor of the Brayton cycle are discussed, it is in terms of reference to a "high performance gas turbine" designed for and operated at conditions where net compressor efficiency exceeds 80%, and net turbine efficiency exceeds 85% at a turbine inlet pressure ratio greater than 4 to 1.

I claim:

1. The method of operating a glass melting furnace with recovery of a portion of the heat being exhausted from the melter comprising the steps of firing the melter with a plurality of burners through one or more burner ports, one or more exhaust ports positioned to receive the exhaust from said melter, passing the exhaust from said melter through a (primary) regenerator to store heat therein, flowing the exhaust gases at about 1350° F. from the regenerator through the primary path of an indirect heat exchanger, adding additional heat to the gases entering the heat exchanger to raise the temperature thereof to about 1600° F. by use of a supplementary burner, passing the spent gases from the heat exchanger to an exhaust stack at a temperature in the range of 450°–500° F., compressing ambient air to about 100 psig, passing the compressed air through the secondary path of the heat exchanger to raise the temperature of the compressed air to about 1450° F., expanding the heated, compressed air in a turbine that is also coupled to the compressor and an electrical generator, exhausting clean air from the turbine at a temperature above 750° F. and atmospheric pressure, using a portion of the exhausted air as the preheated air for the supplementary burner, passing the balance of the exhaust air from the turbine into a heat storage regenerator to raise the temperature of the air to about 2300° F., using this preheated clean air as the combustion air for firing the melter, and reversing the cycle by reversing the firing side and exhaust side of the melter at regular intervals while recovering a portion of the waste heat in the form of electrical energy.

2. Method of recovering waste heat from a glass melting furnace of the regenerative type having left and right side regenerators in a side port or end port configuration, comprising the steps of, withdrawing the heated exhaust gases from the regenerator of one side at a temperature of 1350°–1450° F., operating a trim burner and adding the exhaust gases from the trim burner to the exhaust gases from the regenerator to raise the exhaust gas temperature to about 1600° F., passing the exhaust gases through the primary path of an indirect heat exchanger, passing compressed air at a pressure of 100 psig through the secondary path of said heat exchanger, passing the heated compressed air to the inlet of a turbine of a positive pressure Brayton Cycle Heat Recovery System, introducing the turbine exhaust to the lower end of the other side regenerator at a temperature greater than 750° F., passing the exhaust gases from the heat exchanger to an exhaust stack at a temperature of 450°–500° F. and reversing the cycle as the furnace firing is normally reversed, so as to produce a continuous output of molten glass and electrical energy from the Brayton cycle.

3. The method of claim 2 further including spilling a portion of the preheat air from the turbine exhaust in order to provide the correct quantity of preheated combustion air to the regenerator.

4. The method of claim 3, wherein the spilled air is used for space heating.

5. The method of converting waste heat to electrical power from a regenerative type high temperature industrial process having a pair of regenerators, comprising the steps of withdrawing the heated exhaust gases from the high temperature process, passing the exhaust gases through one regenerator, feeding the exhaust gases from the one regenerator at a temperature greater than 1400° F. to the primary path of the heat exchanger of a modified, positive pressure Brayton cycle energy recovery system where the heat content of the exhaust gases is transferred to the stream of clean pressurized air from the compressor prior to entry of said clean air into the turbine, introducing the major portion of the turbine exhaust to the lower end of the other side regenerator at a temperature greater than 750° F., passing the exhaust gases from the primary path of the heat exchanger to an exhaust stack at a temperature in the range of 450°–500° F., and generating electrical power with the turbine-compressor drive output of the Brayton cycle.

6. The method of claim 5 wherein the air flow through the compressor section exceeds 10 lbs. per second.

7. The method of claim 5 wherein said compression section is formed of plural stages and intercooling the air between stages of compression to thereby increase the overall output of the system.

8. The method of claim 5, further including the step of increasing the temperature of the inlet air to the turbine to a level of at least 1450° F.

9. The method of claim 8 wherein said step of increasing the temperature of the air to the turbine is by firing a trim burner with its exhaust gases being connected to the exhaust gases entering the heat exchanger.

10. The method of claim 5 wherein said high temperature industrial process is a glass melting furnace.

* * * * *